United States Patent
Lockhart et al.

(10) Patent No.: US 10,813,725 B2
(45) Date of Patent: Oct. 27, 2020

(54) DENTAL SURGICAL GUIDE ATTACHMENT SYSTEM

(71) Applicant: Lockhart & Lockhart, PLLC, Charlotte, NC (US)

(72) Inventors: Bryan Allen Lockhart, Charlotte, NC (US); Lauren Rennick Lockhart, Charlotte, NC (US)

(73) Assignee: Lockhart & Lockhart, PLLC, Charlotte, NC (US)

( * ) Notice: Subject to any disclaimer, the term of this patent is extended or adjusted under 35 U.S.C. 154(b) by 233 days.

(21) Appl. No.: 15/926,465

(22) Filed: Mar. 20, 2018

(65) Prior Publication Data

US 2019/0290405 A1  Sep. 26, 2019

(51) Int. Cl.
*A61C 8/00* (2006.01)
*A61C 1/08* (2006.01)

(52) U.S. Cl.
CPC ............ *A61C 8/0089* (2013.01); *A61C 1/082* (2013.01)

(58) Field of Classification Search
CPC .............................. A61C 8/0089; A61C 1/082
USPC ................................................... 433/8–24, 75
See application file for complete search history.

(56) References Cited

U.S. PATENT DOCUMENTS

| | | | |
|---|---|---|---|
| 2010/0129765 A1* | 5/2010 | Mohr | A61C 7/12 433/10 |
| 2012/0129123 A1* | 5/2012 | Yao | A61C 1/084 433/24 |
| 2015/0223914 A1* | 8/2015 | Sabilla | A61C 7/287 433/11 |
| 2015/0282899 A1* | 10/2015 | Steffen | A61C 7/36 433/19 |
| 2015/0327950 A1* | 11/2015 | Yao | A61C 7/14 433/3 |

* cited by examiner

*Primary Examiner* — Matthew M Nelson
(74) *Attorney, Agent, or Firm* — James G. Passé; Passé Intellectual Property, LLC

(57) ABSTRACT

A device for attaching dental surgical guides without surgical attachment to the patient's internal skeletal structures, including gingival tissues and/or bone. The device attaches to the front surface of the upper or lower teeth, and the dental surgical guides can then attach to the device.

9 Claims, 2 Drawing Sheets

DENTAL SURGICAL GUIDE ATTACHMENT SYSTEM

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to attachment of dental surgical guides. In particular, it relates to a system for attaching a surgical guide in individuals who don't have braces or any other fixed appliances to affix the surgical guide to. In particular, it relates to a device that attaches to teeth which one can attach a surgical guide without further surgery or invasive techniques.

Description of Related Art

Surgical guides are normally used during orthognathic dental surgery to aid in the accuracy of jaw movements to facilitate the proposed surgery. When an individual has attached braces, there are ways to attach a surgical guide without further surgical attachment to the bony or gingival tissues by attachment to the anchored braces. However, when an individual does not have braces, the surgical guide is attached to mini implants or arch bars. Both of which are surgically invasive, leading to additional recovery and increased chance for infection. In addition, there is residual pain associated with the surgical attachment of a dental guide in these cases.

While the art is replete with various surgical guides without braces, they all attach in a surgical manner. This includes drilling into the gums, lug attachment to the gingival tissues, and the like. It's clear that there is an increased risk of pain and infection from orthognathic surgery alone; that risk increases when the surgical guide has to be attached surgically. Accordingly, non-surgical means for attaching a surgical guide has long been needed.

BRIEF SUMMARY OF THE INVENTION

The present invention relates to the discovery that there is a system for patients without braces that can attach to teeth without surgery that can be easily mounted for surgery and removed after surgery. This new system solves the problems of the prior art by eliminating surgical attachment of a surgical guide.

Accordingly, in one embodiment, there is a device for attachment of a dental surgical guide to a patient's teeth comprising:
 a) a plurality of base pads each of which attaches to an individual tooth of an upper or lower set of teeth of the patient;
 b) a plurality of connectors wherein each connector attaches to a single base pad of the plurality of base pads;
 c) a single bar which attaches to each of the plurality of connectors; and
 d) a plurality of lugs which are attached perpendicular to the bar of sufficient size to attach the surgical guide.

In another embodiment, there is a method of attaching a dental surgical guide to a patient comprising:
 attaching to the patient's teeth a device for mounting the dental surgical guide, the device comprising:
  a) a plurality of base pads each of which attaches to an individual tooth of an upper or lower set of teeth of the patient;
  b) a plurality of connectors wherein each connector attaches to a single base pad of the plurality of base pads;
  c) a single bar which attaches to each of the plurality of connectors; and
  d) a plurality of lugs which are attached perpendicular to the bar of sufficient size to attach the surgical guide; and
 attaching the dental surgical guide to the lugs of the device for mounting the surgical guide.

DETAILED DESCRIPTION OF THE INVENTION

Figure 1:
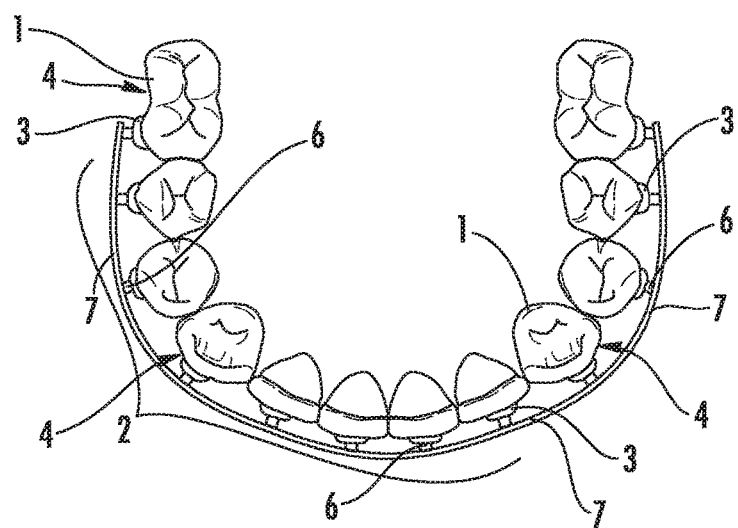
FIG. 1 is a top view of a set of teeth with the present device attached.

While this invention is susceptible to embodiment in many different forms, there is shown in the drawings, and will herein be described in detail, specific embodiments with the understanding that the present disclosure of such embodiments is to be considered as an example of the principles and not intended to limit the invention to the specific embodiments shown and described. In the description below, like reference numerals are used to describe the same, similar, or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or", as used herein, is to be interpreted as an inclusive or meaning any one or any combination. Therefore, "A, B, or C" means any of the following: "A; B; C; A and B; A and C; B and C; A, B, and C". An exception to this definition will occur only when a combination of elements, functions, steps, or acts are in some way inherently mutually exclusive.

The drawings featured in the figures are for the purpose of illustrating certain convenient embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term "dental surgical guide" refers to a device used in dental surgery that guides the dentist's work. This is usually used during orthognathic surgery cases in which one or both jaws have to be repositioned. It serves as a way for the surgeon to verify that the surgical movements are correct and precise. In this embodiment, the dental surgical guide can be attached to the lugs of the attachment device by any convenient method. In one embodiment, it is attached by using ligatures (see e.g. FIG. 4).

As used herein, the term "device for attachment" refers to the fact that normally there are devices that attach to a person's braces, or if no braces, the devices are surgically attached to the patient. The device of this invention is a device that attaches non-surgically to a patient without braces.

As used herein, the term "patient" refers to a person who is having dental surgery of the type that needs a dental surgery guide wherein the device can attach to the teeth of the patient.

As used herein, the term "base pad" refers to a small pad like material that is attached to a plurality of the patient's teeth, one per tooth, in the upper or lower set of teeth. While the base pads can be attached to less than all of the teeth in the upper or lower set, in one embodiment, there is one base pad attached to each of the teeth in either the upper or lower set of teeth. In one embodiment, the pad is an 80 gauge mesh pad. Other materials include various degrees of mesh and can be ceramic or any variant of metal or contain any variation in composition of metal. It is understood that the selection of materials is such that it can be attached to the tooth and a connector can attach to the pad. The size depends on the patient, but in general, the base pad is adhered to the front surface of the tooth. Size then will depend on the size of the individual tooth.

As used herein, the term "tooth" refers to the standard single tooth of a patient who is having dental surgery.

As used herein, the term "upper and lower set of teeth" refers to each of the set of teeth located in the upper jaw or entirely in the lower jaw. The device of the invention can be attached to one or the other.

As used herein, the term "connectors" refers to a short rod in the 2 to 5 mm length (in one embodiment 3 mm) that is attached perpendicular to the base pad, as shown in the Figures. The diameter will be in a range of 0.016 in-0.020 in. In one embodiment, the material the rod is made from is stainless steel. It will be assumed that the rod will not easily bend during the actual use. One of skill in the art can determine stiffness based on the disclosure herein.

As used herein, the term "bar" refers to a single piece of material that wraps around the upper set of teeth and attaches to each of the connectors. Once again, it needs to be a safe and rigid surgery compatible material such as stainless steel or any variation of metal or contain metal properties. In one embodiment, it is a stainless steel wire. In another embodiment, it is 0.019 in high and 0.025 in deep stainless steel wire.

As used herein, the term "lugs" refers to short rods of 2 to 5 mm length (in one embodiment 3 mm) that are attached perpendicular to the bar, usually in a vertical position, pointing up or down. Other positions can also be determined from the disclosure herein. The lug is used for retention of the surgical guide, as shown in the Figures, which follow. In one embodiment, the base pad, connector, and lug are a single assembly of parts which can be positioned by sliding along the bar to the desired position and affixed to the bar using a crimping instrument.

As used herein, the term "attached" refers to adhered sufficiently to keep attached during surgery. In the case of the base pad, it is attached in a manner that can be removed. The remaining pieces can be more or less permanently attached to one another, if desired. Since this is built to each patient's mouth, it is more likely that some pieces will start out separate during the attachment. Attachment can be by including, but not limited to, dental cement, dental composite, dental bonding agents, glue, welding or soldering metal parts, and the like.

The present invention also relates to the attachment of the device of the invention to the patient and then the attachment of a surgical guide to the device.

DRAWINGS

Now referring to the drawings, FIG. 1 is a top view of the bottom set of teeth 1 of an individual. In this view, all of the device for attachment 2 can be seen except for the lugs. In this view, base pads 3 are shown attached to the front face 4 of each of the shown teeth. Attached to the base pad is connector 6 which extends outward perpendicularly from front face 4 and base pad 3. A single bar 7 is shown with attachment to each of the connectors 6. The lugs, not shown in this view, are perpendicular to single bar 7 and thus hidden below single bar 7.

Figure 2:
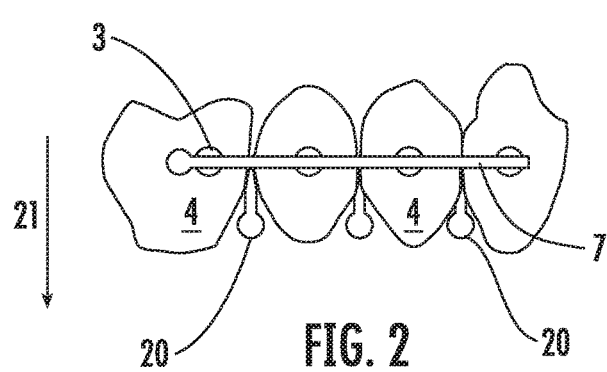
FIG. 2 is front view of four teeth showing the device attached.
Figure 3:
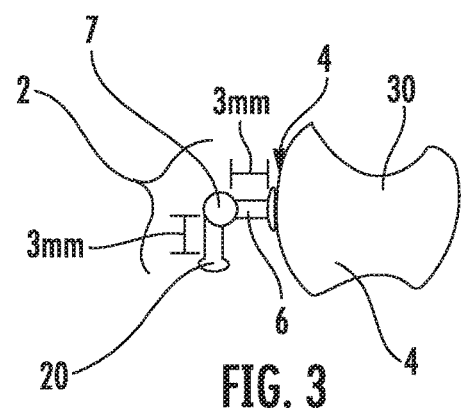
FIG. 3 is a side view of attachment of the device to an individual tooth.

FIG. 2 is a frontal view of four teeth of the lower set of teeth 1 shown in FIG. 1. In this view, we can see lugs 20 extending perpendicular downward 21 from single bar 7. In this view, the connectors 6 are hidden behind the single bar 7 and thus are not seen. In FIG. 3 we see a side view of a single tooth 30 and a cross section of attachment device 2. This would also represent the embodiment wherein the base pad, connector, and lug are a single assembly.

Figure 4:
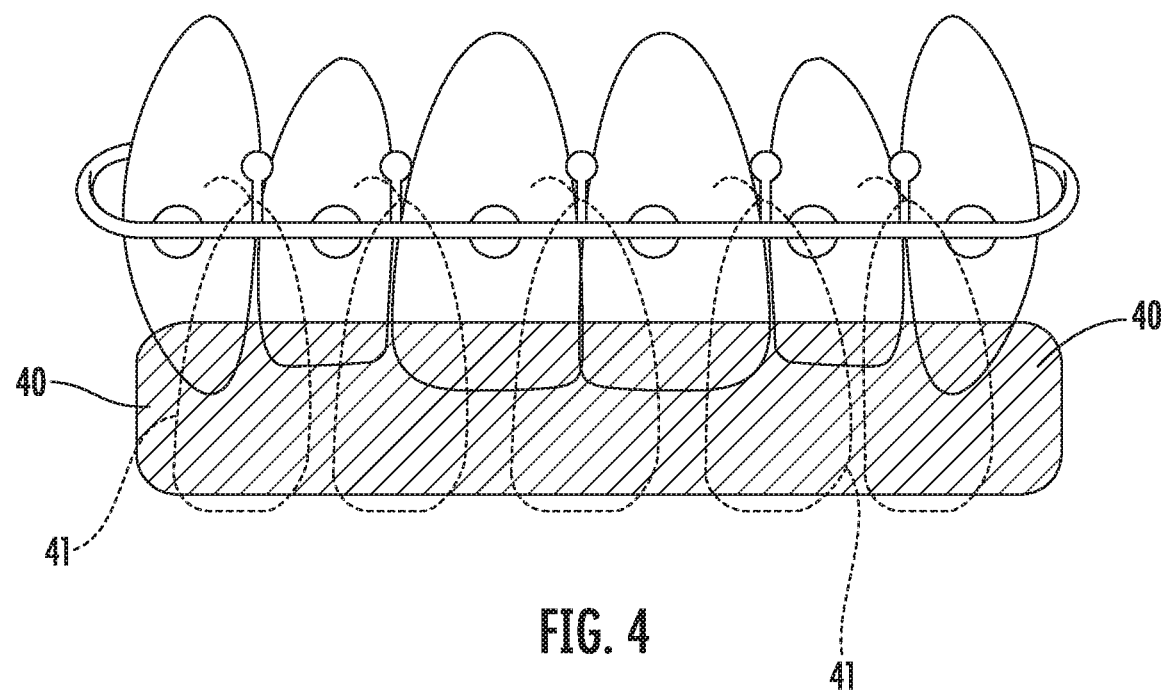
FIG. 4 shows the attachment of a dental surgical guide to the device of the present invention.

In FIG. 4 there is a frontal view of the device 2 attached to 5 teeth with the lugs 20 pointing upwards. In this view, a surgical guide 40 is attached to the attachment device via ligatures 41 which are attached to lugs 20 by tightly twisting the steel ligature tie around the lug to ensure that the ligature is tied to the lug.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials, and the like apparent to those skilled in the art still fall within the scope of the invention as claimed by the applicant.

What is claimed is:

1. A device for attachment of a dental surgical guide to a patient's teeth comprising:
    a) a plurality of base pads wherein each base pad attaches to an individual tooth of an upper or lower set of teeth of the patient;
    b) a plurality of rods of 2 mm to 5 mm in length wherein a first end of each rod attaches to a single base pad of the plurality of base pads such that each rod is perpendicular to the base pad it is attached to;
    c) a single wire which rigidly attaches to a second end of each of the plurality of rods; and
    d) a plurality of dental surgical guide lugs of 2 mm to 5 mm in length which are attached perpendicular to the wire.

2. The device for attachment of a dental surgical guide to a patient's teeth according to claim 1 wherein the base pad is made of a stainless steel mesh pad.

3. A The device for attachment of a dental surgical guide to a patient's teeth according to claim 1 wherein attachment to the teeth is accomplished by use of at least one selected from the group consisting of a dental composite, a dental bonding agent, and a dental glue.

4. The device for attachment of a dental surgical guide to a patient's teeth according to claim 1 wherein the wire is made of stainless steel.

5. The device for attachment of a dental surgical guide to a patient's teeth according to claim 1 wherein the dental surgical guide lugs are laser welded to the wire.

6. The device for attachment of a dental surgical guide to a patient's teeth according to claim 1 which further comprises the device with a dental surgical guide attached to the dental surgical guide lugs.

7. The device for attachment of a dental surgical guide to a patient's teeth according to claim 6 wherein the dental surgical guide is attached to the dental surgical guide lugs by ligatures.

8. The device for attachment of a dental surgical guide to a patient's teeth according to claim 1 wherein the dental surgical guide lugs are pointed either upward or downward.

9. The device for attachment of a dental surgical guide to a patient's teeth according to claim 1 wherein the wire is about 0.019 in high and 0.025 in deep.

* * * * *